3,459,816
DINITRODIALKYLBENZENE
William A. Pritchett, Rochester, N.Y., assignor to E. I. du Pont de Nemours and Company, Wilmington, Del., a corporation of Delaware
No Drawing. Continuation-in-part of application Ser. No. 597,531, Nov. 29, 1966. This application Dec. 14, 1967, Ser. No. 690,427
Int. Cl. C07c 79/10, 87/28, 119/04
U.S. Cl. 260—645      6 Claims

ABSTRACT OF THE DISCLOSURE

Dinitro-dialkyl benzenes are prepared by nitrating a dialkylbenzene with $N_2O_4$ in a halogenated hydrocarbon solvent at a temperature of about 90 to 160° C. The obtained compounds are useful as solvents and also as chemical intermediates. For example, the nitrated products can be reduced to the corresponding amines.

CROSS-REFERENCE TO RELATED APPLICATION

This application is a continuation-in-part of my co-pending application Ser. No. 597,531, filed Nov. 29, 1966, now abandoned.

BACKGROUND OF THE INVENTION

The nitration of organic compounds is conventionally carried out by using nitric acid as the nitrating agent. Using this process, nitro groups have been added to unsaturated compounds and onto aromatic rings. Similarly, nitro groups have been substituted on alkyl substituents of aryl compounds; however, compounds having nitro substituents on each alkyl substituent of poly-alkyl-substituted aryl compounds have heretofore been unknown in the art.

SUMMARY OF THE INVENTION

This invention provides compounds of the general formula:

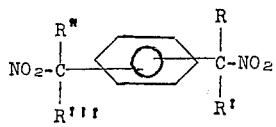

wherein R, R', R", and R''' are independently selected from the group consisting of hydrogen and alkyl radicals of from 1–4 carbon atoms.

DESCRIPTION OF THE PREFERRED EMBODIMENTS

These compounds can be made by nitrating aryl compounds with dinitrogentetroxide in per-halo-hydrocarbon solvents. By this process, the compounds of the instant invention can be prepared, for example, from alkyl substituted aryl hydrocarbons, e.g., those substituted with alkyl groups of from 1–8 carbon atoms, such as para-xylene,
ortho-xylene,
meta-xylene,
1,4-diisopropyl benzene,
1,4-diethyl benzene,
1,3-diethyl benzene,
1,4-dipentyl benzene;
$\alpha,\alpha,\alpha',\alpha'$-tetraethyl-p-xylene;
$\alpha,\alpha'$-dimethyl-$\alpha,\alpha'$-diethyl-p-xylene; and
$\alpha,\alpha,\alpha',\alpha'$-tetrapropyl-p-xylene; and of nitrocompounds substituted with less than the total number of nitro groups, which can be attached by the above-mentioned reaction, such as $\alpha$-nitro-p-xylene.

The solvent for the dinitrogentetroxide ($N_2O_4$) can be a hydrocarbon, e.g., of from 1–8 carbon atoms fully halogenated with one or more of chlorine and fluorine, for example, trichloro, -trifluoro, -ethane; hexachloro,-hexafluoropentane, hexachloro-ethane and carbon tetrachloride. This solvent is preferably a liquid with a boiling point of about from 0 to 200° C.

Both of the reactants involved in this invention are placed in a solution of one or more of the liquid halogenated hydrocarbons of the type specified. Preferably both reactants are dissolved in the same solvent. The quantity of solvent used is that which is sufficient to dissolve the starting materials, usually about from 1–2 parts by weight of solvent to one part of dinitrogentetroxide and about from 1 to 4 parts of solvent to one part of the hydrocarbon starting material.

The reaction usually is carried on at temperatures about from 90 to 160° C., and preferably at about from 110° to 130° C. It is preferred that the organic reactant solution be heated to this temperature range before combination with the $N_2O_4$ solution. In this way the reaction takes place nearly instantaneously and undesirable side products are minimized, thereby maximizing the desired nitro-additions. Usually the reaction is carried out at a pressure of about from 1–35 atmospheres, and preferably about 15 atmospheres.

The dinitrogentetroxide solution is added slowly, e.g., over a 10–90 minute period until an excess of dinitrogentetroxide is present. Upon completion of the addition of the $N_2O_4$, the reaction solution can be allowed to cool to an ambient temperature at which point the solid reaction product can be conveniently removed, e.g., by filtration. The products resulting from this reaction include not only the mono- and poly-nitro-substituted starting materials, but mono- and di-carboxylic acids, carbonyl compounds, unreacted starting materials and other side products.

These reaction products can be separated into neutral, weakly acidic and strongly acidic fractions using classical extraction procedures. The nitro-substituted reaction products will normally comprise the weakly acidic fraction, and can be further separated, for example, by molecular distillation.

The nitro groups in the novel compounds of this invention are substituted on the alkyl substituent, most often to the benzylic carbon atom. The resulting products, therefore, include, for example, $\alpha,\alpha'$-dinitro-para-xylene;
$\alpha,\alpha'$-dinitro-ortho-xylene;
$\alpha,\alpha'$-dinitro-meta-xylene;
$\alpha,\alpha,\alpha',\alpha'$-tetramethyl-$\alpha,\alpha'$-dinitro-p-xylene;
$\alpha,\alpha'$-dinitro-1,4-diethyl-benzene;
$\alpha,\alpha,\alpha',\alpha'$-tetraethyl-$\alpha,\alpha'$-dinitro-p-xylene;
$\alpha,\alpha'$-diethyl-$\alpha,\alpha'$-dimethyl-$\alpha,\alpha'$-dinitro-p-xylene;
$\alpha,\alpha,\alpha',\alpha'$-tetrapropyl-$\alpha,\alpha'$-dinitro-p-xylene; and
1-($\alpha$-nitromethyl)-4-methoxy carbonyl benzene.

Products of the instant invention are useful as solvents and chemical intermediates and particularly as intermediates for certain amines, aldehydes, ureas and organic acids. For example, the nitrated products can be reduced with hydrogen with or without a catalyst to the corresponding amines. These amines can be reacted with phosgene ($COCl_2$) to form isocyanates and diisocyanates. Treatment of the diisocyanates with polyols such as polytetramethylene ether glycol yields polyurethanes. Polyurethanes can be chain extended to form elastic fibers. Ureas generally can be obtained by treatment of the isocyanate with an amine, or by treatment of an arylamine with aqueous sodium cyanate and acetic acid. The use of diamines obtained by the reduction of the nitrated reaction products as intermediates for the synthesis of polymers such as nylon is described in U.S.P. 2,878,235.

In the following examples, which further illustrate the instant invention, parts and percentages are by weight.

Example 1.—Nitro-substitution of p-xylene 318 parts of p-xylene are heated to 140° under autogenous pressure and a solution of 210 parts $N_2O_4$ in 155 parts trifluorotrichloroethane is injected into the hot p-xylene at a rate of about 2 parts/min. Temperature of the reaction is kept at 140° ± 10° with the reaction pressure reaching 500 p.s.i.g. at which pressure venting occurs. Upon completing addition of the $N_2O_4$-trichlorotrifluoroethane solution, the reaction mixture is cooled, vented to atmospheric pressure, and discharged. The solid acid produced is removed by vacuum filtration and the filtrate is separated into a portion soluble in 5% aqueous sodium bicarbonate, a portion soluble in 10% aqueous sodium hydroxide and a neutral portion.

The bicarbonate-soluble portion is acidified to a pH of 2 with 20% aqueous hydrochloric acid. When combined with acid originally collected from the reaction mixture, a yield of 133 parts of a mixture of p-toluic acid and terephthalic acid is obtained.

The portion soluble in 10% aqueous sodium hydroxide is acidified to a pH of 5 with 50% aqueous acetic acid. A mixture of $\alpha,\alpha'$-dinitro-p-xylene and $\alpha$-nitro-p-xylene is extracted with ether and washed with water until the washings are neutral. After removal of the solvent, the mononitrated product is removed by molecular distillation at a temperature of 40–50° C. and a pressure of $10^{-3}$ to $10^{-4}$ mm. Hg 76 parts of solid $\alpha,\alpha'$-dinitro-p-xylene are obtained as residue, and 24 parts $\alpha$-nitro-p-xylene are recovered as distillate.

The neutral phase yields 10.3 parts of p-tolualdehyde and 6.5 parts p-xylene.

Upon analysis of the nitro reaction product, the nuclear magnetic resonance spectrum is found to be consistent with the structure for $\alpha,\alpha'$-dinitro-p-xylene, showing only two peaks, an aromatic singlet at $2.34^\tau$ and a methylene singlet at $4.26^\tau$ in a ratio of 1:1.

Analysis.—Calcd. for $C_8H_8N_2O_4$: C, 48.99; H, 4.11; N, 14.28. Found: C, 49.36; H, 4.36; N, 13.73.

Molecular weight calculated 196; Found 198 (vapor-phase osmometer, benzene); Neutral equivalent calculated 98; Found 94 and 96.

After recrystallization from ethanol, the melting point of the $\alpha,\alpha'$-dinitro-p-xylene is found to be 134–135° C.

If $\alpha,\alpha,\alpha',\alpha'$-tetra-ethyl-p-xylene is substituted for p-xylene, $\alpha,\alpha$-dinitro-$\alpha,\alpha',\alpha'$-tetraethyl-p-xylene is obtained instead of $\alpha,\alpha'$-dinitro-p-xylene.

Example 2

In a similar manner, 50 parts of p-diisopropyl benzene is dissolved in 170 parts of trichlorotrifluoroethane and 33 parts of dinitrogentetroxide is dissolved in 46 parts trichlorotrifluoroethane. Both solutions are heated and maintained at a temperature within the range of 115–125° C. After heating, the dinitrogentetroxide solution is added to the diisopropyl benzene solution slowly, over a period of 10 minutes. The pressure within the reaction vessel is maintained at 150 lbs./sq. inch. The reaction mixture is then cooled and purified according to the methods described in Example 1. 30 parts of $\alpha,\alpha,\alpha'$-$\alpha'$-tetramethyl-$\alpha,\alpha'$-dinitro-p-xylene having a melting point of 156.5–158° C. is obtained.

Analysis.—Calcd. for $C_{12}H_{16}N_2O_4$: C, 57.13; H, 6.39; N, 11.11. Found: C, 57.17, 57.36; H, 6.66, 6.52; N, 10.96, 10.92.

Example 3

Example 2 is repeated using a solution of 50 parts of para-diisopropyl benzene in 170 parts trichlorotrifluoroethane, and a solution of 92 parts of dinitrogentetroxide in 90 parts of trichlorotrifluoroethane. After heating the reactants to a temperature of from 110–120° C., they are combined over a period of 25 minutes during which time the pressure in the reaction vessel is maintained at approximately 250 p.s.i. Upon separation of the reaction products as indicated in Example 1, 43 parts of $\alpha,\alpha,\alpha',\alpha'$-tetrametyhl-$\alpha,\alpha$-dinitro-p-xylene is obtained.

What is claimed is:

1. Compounds of the general formula

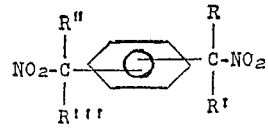

wherein R, R', R'', and R''' are independently selected from the group consisting of hydrogen and alkyl radicals of from 1–4 carbon atoms.

2. A compound of claim 1 wherein R, R', R'', and R''' are hydrogen.

3. A compound of claim 1 wherein R, R', R'', and R''' are methyl groups.

4. A compound of claim 1 wherein R, R', R'', and R''' are ethyl groups.

5. $\alpha,\alpha'$-dinitro-p-xylene.

6. $\alpha,\alpha,\alpha',\alpha'$-tetramethyl-$\alpha,\alpha'$-dinitro-p-xylene.

References Cited

FOREIGN PATENTS 6,076   7/1911   Great Britain.

OTHER REFERENCES

Beilsteins Handbuch der Organischen Chemie, Vierte Auflage, Fünfter Band, Zweiter Teil, Springer-Verlag, New York, 1964 pp. 822–823.

Urbanski, Chemistry and Technology of Explosives, vol. I, The McMillan Company, New York, 1964, pp. 598–599 and 601.

LELAND A. SEBASTIAN, Primary Examiner

U.S. Cl. X.R.

260—688